United States Patent
Wang et al.

(10) Patent No.: US 12,449,488 B2
(45) Date of Patent: Oct. 21, 2025

(54) METHOD AND SYSTEM FOR INITIAL SELF-HEALING TYPE CLASSIFICATION OF METALLIZED FILM CAPACITORS

(71) Applicant: Chongqing University, Chongqing (CN)

(72) Inventors: Feipeng Wang, Chongqing (CN); Jie Zhang, Chongqing (CN); Yushuang He, Chongqing (CN); Jian Li, Chongqing (CN); Weigen Chen, Chongqing (CN); Zhengyong Huang, Chongqing (CN); Qiang Wang, Chongqing (CN); Xiao Zhang, Chongqing (CN)

(73) Assignee: Chongqing University, Chongqing (CN)

( * ) Notice: Subject to any disclaimer, the term of this patent is extended or adjusted under 35 U.S.C. 154(b) by 142 days.

(21) Appl. No.: 18/433,502

(22) Filed: Feb. 6, 2024

(65) Prior Publication Data

US 2024/0272240 A1 Aug. 15, 2024

(30) Foreign Application Priority Data

Feb. 11, 2023 (CN) .......................... 202310098802.X (51) Int. Cl.
*G01R 31/12* (2020.01)
*G01R 31/64* (2020.01)
(Continued)

(52) U.S. Cl.
CPC ............. *G01R 31/64* (2020.01); *H01G 4/015* (2013.01); *H01G 4/33* (2013.01)

(58) Field of Classification Search
CPC .... G01R 31/016; G01R 31/14; G01R 31/162; G01R 31/64; G01R 31/1227; H01G 4/08;
(Continued)

(56) References Cited

U.S. PATENT DOCUMENTS

| 5,019,418 A * | 5/1991 | Linzey ..................... H01G 2/20 29/25.42 |
| 2015/0255227 A1* | 9/2015 | Chen ...................... H01G 11/28 427/79 |

(Continued)

FOREIGN PATENT DOCUMENTS

| CN | 101944777 A | 1/2011 |
| CN | 103413680 A | 11/2013 |

(Continued)

OTHER PUBLICATIONS

IEC 60384-17, Fixed capacitors for use in electronic equipment—Part 17: Sectional specification—Fixed metallized polypropylene film dielectric AC and pulse capacitors, International Standard, 2019, pp. 1-90.

*Primary Examiner* — Thang X Le
(74) *Attorney, Agent, or Firm* — Bayramoglu Law Offices LLC (57) ABSTRACT

A method and a system for initial self-healing type classification of metallized film capacitors, which relate to the technical field of high-voltage capacitors. The method comprises: applying voltages at different voltage ramp rates to metallized film capacitors to be tested, and determining a voltage bearing range of the metallized film capacitors; determining, according to a corresponding voltage of the metallized film capacitors when initial self-healing occurs and a residual voltage after the initial self-healing occurs, corresponding initial self-healing energy of metallized film capacitors when the initial self-healing occurs; establishing an initial self-healing voltage-energy database according to an initial self-healing voltage of the samples when the initial self-healing occurs and the corresponding initial self-healing energy when the initial self-healing occurs; and classifying the metallized film capacitors by combining an initial self- (Continued)

healing recovery condition and the subsequent service life and performance data of the metallized film capacitors.

6 Claims, 8 Drawing Sheets

(51) Int. Cl.
*H01G 4/015* (2006.01)
*H01G 4/33* (2006.01)

(58) Field of Classification Search
CPC .......... H01G 4/012; H01G 4/15; H01G 4/30; H01G 4/32; H01G 4/33; H01G 4/232; H01G 13/00
See application file for complete search history.

(56) References Cited

U.S. PATENT DOCUMENTS

2018/0374647 A1* 12/2018 Hettler .................. H01G 4/018
2020/0194179 A1* 6/2020 Yializis ................ C08F 122/14

FOREIGN PATENT DOCUMENTS

| CN | 110261698 A | 9/2019 |
| CN | 110687369 A | 1/2020 |
| CN | 112444700 A | 3/2021 |
| WO | 2010001348 A1 | 1/2010 |

* cited by examiner

METHOD AND SYSTEM FOR INITIAL SELF-HEALING TYPE CLASSIFICATION OF METALLIZED FILM CAPACITORS

CROSS REFERENCE TO RELATED APPLICATIONS

This application is based upon and claims foreign priority to Chinese Patent Application No. CN202310098802.X, filed on Feb. 11, 2023, the entire contents of which are incorporated herein by reference.

TECHNICAL FIELD

The present invention relates to the technical field of high-voltage-resistant capacitors, and in particular, to a method and a system for initial self-healing type classification of metallized film capacitors.

BACKGROUND

At present, metallized film capacitors (MFCs) are usually made by winding organic plastic films as insulating media and metallized films as electrodes. Compared with traditional capacitors, the MFCs have the advantages of long cycle life, high charging and discharging speed, high power density and special self-healing characteristic, and thus are widely applied to electromagnetic weapons, vehicle-mounted devices and microwave power source systems. The self-healing process is the key for guaranteeing the operating characteristics of the MFCs. The current density suddenly rises in the case of local dielectric breakdown, and the stored energy dissipates in the breakdown area. The electrical explosion of the metallized electrode caused by this phenomenon will damage the electrode and the dielectric in the area near the breakdown channel. The subsequent micro-arc discharge develops in microseconds to form a demetallized area. This area isolates the breakdown place from the rest part of the electrode, thus restoring the capacitor's ability to operate. Therefore, the MFC is able to operate normally even under an extreme voltage working condition.

However, there is randomness in the self-healing performance of the MFC and a certain aggregation effect at the position where self-healing occurs inside the capacitor. In addition, IEC 60384-17-2019 shows that a capacitor is determined to fail if its capacitance drops by more than 5%. As the MFC is continuously self-healed in the working process, the area of the internal metallized electrode is reduced, such that the capacitance of the MFC continuously drops, the service life of the MFC is influenced, and thus the MFC has potential safety hazards in the subsequent use process.

Therefore, how to provide a safe, reliable and widely applicable method for initial self-healing type classification of capacitors is an urgent problem to be solved by those skilled in the art.

SUMMARY

In view of this, the present invention provides a method for initial self-healing type classification capable of determining the reliability of metallized film capacitors in the subsequent working process. The method can classify the metallized film capacitors by observing the development of the initial self-healing of the metallized film capacitors, and achieve the evaluation of the applicable voltage range and the subsequent service lives of the metallized film capacitors.

In order to achieve the above objective, the present invention adopts the following technical solutions:

Provided is a method for initial self-healing type classification of metallized film capacitors, which includes the following steps:

step 1: applying voltages at different voltage ramp rates to metallized film capacitors to be tested, and determining a voltage bearing range of said metallized film capacitors;

step 2: determining, according to corresponding voltages of said metallized film capacitors when initial self-healing occurs and residual voltages after the initial self-healing occurs, corresponding initial self-healing energy of metallized film capacitors when the initial self-healing occurs within the voltage bearing range of said metallized film capacitors;

step 3: establishing an initial self-healing voltage-energy database according to a corresponding relationship between the corresponding initial self-healing voltages of said metallized film capacitor samples when the initial self-healing occurs and the corresponding initial self-healing energy when the initial self-healing occurs; and step 4: classifying the metallized film capacitors by utilizing the initial self-healing voltage-energy database and combining an initial self-healing recovery condition and subsequent service lives and performance data of said metallized film capacitors.

Preferably, the step 1 specifically includes: according to the corresponding voltages of said metallized film capacitors when the initial self-healing occurs and the initial self-healing recovery condition under the voltages at the different voltage ramp rates, specifying $U_{nom}$ as a nominal voltage of the metallized film capacitors, and taking a voltage range of $U_1 \sim U_4$ as the voltage bearing range of said metallized film capacitors, when the external voltage is less than $U_1$, no self-healing phenomenon generated in the capacitors; and when the external voltage is more than $U_4$, the voltage exceeding a self-healing recovery bearing range of the capacitors.

Preferably, the step 2 specifically includes: within the voltage bearing range of said metallized film capacitors determined in the step 1, determining, by using an electrical formula, the corresponding energy when the initial self-healing of said metallized film capacitors occurs, wherein the formula is as follows:

$$E_{SHI} = \frac{C_x}{2}(U_{SHI}^2 - U_{RES}^2)$$

wherein $E_{SHI}$ is the corresponding energy when the initial self-healing of said metallized film capacitors occurs, in a unit of mJ; $C_x$ is a capacitance of said metallized film capacitors, in a unit of μF, and $U_{SHI}$ is a voltage generated when the initial self-healing occurs, in a unit of V; $U_{RES}$ is the residual voltage after the initial self-healing occurs, in a unit of V. Preferably, the step 3 specifically includes: subjecting the established initial self-healing voltage-energy database to a nonlinear fitting method and determining that the initial self-healing voltage and the initial self-healing energy meet the relation of $E_{SHi}=aU_{SHi}{}^n$ $n \in [2,4]$, where $n \in R$, $$a = \frac{kC_0}{\beta^\alpha \cdot f(P)},$$

$C_0$ is the capacitance, $\beta$ is the square resistance, $f(P)$ is the interlayer pressure function, and $\alpha$, k are the coefficients, so as to define the boundary range of the initial self-healing voltage-energy database.

Preferably, an applicable voltage range of the metallized film capacitors is demarcated according to the multiple of the nominal voltage $U_{nom}$ of the metallized film capacitors, and the capacitors are classified according to the initial self-healing recovery condition, and a specific classification method is as follows:

an external voltage is applied to the metallized film capacitor, and the initial self-healing voltage boundary is defined, wherein $U_3$ is the upper boundary, and the corresponding initial self-healing energy is $E_{SH2}$; $U_2$ is the lower boundary, and the corresponding initial self-healing energy is $E_{SH1}$, and if:

(1) no self-healing occurs within $U_1 \sim U_4$, the metallized film capacitor is an A-level capacitor;

(2) the initial self-healing voltage is within $U_3 \sim U_4$, the initial self-healing energy is smaller than $E_{SH2}$, and after initial self-healing recovery, the voltage can rise to $U_4$ at an original voltage ramp rate, the metallized film capacitor is a B-level capacitor, and otherwise, the metallized film capacitor is a C-level capacitor;

(3) the initial self-healing voltage is within $U_2 \sim U_3$, the initial self-healing energy is smaller than $E_{SH1}$, and after initial self-healing recovery, the voltage can rise to $U_3$ at the original voltage ramp rate, the metallized film capacitor is the C-level capacitor, and otherwise, the metallized film capacitor is a D-level capacitor;

(4) the initial self-healing voltage is within $U_1 \sim U_2$, and after initial self-healing recovery, the voltage can rise to $U_2$ at the original voltage ramp rate, and the metallized film capacitor is the D-level capacitor;

(5) the initial self-healing voltage is within $0 \sim U_1$, or the initial self-healing occurs in the above areas, the self-healing voltage cannot be recovered, and the metallized film capacitor is the E-level capacitor along with intensive self-healing.

In order to achieve the above objective, the present invention further provides a system for initial self-healing type classification of metallized film capacitors, which includes:

a voltage range measuring module, configured to apply voltages at different voltage ramp rates to metallized film capacitors to be tested, and determine a voltage bearing range of said metallized film capacitors;

an energy measuring module, configured to determine, according to corresponding voltages of said metallized film capacitors when initial self-healing occurs and residual voltages after the initial self-healing occurs, corresponding initial self-healing energy of said metallized film capacitors when the initial self-healing occurs within the voltage bearing range of said metallized film capacitors;

a database establishing module, configured to establish an initial self-healing voltage-energy database according to a corresponding relationship between the corresponding initial self-healing voltages of said metallized film capacitor samples when the initial self-healing occurs and the corresponding initial self-healing energy when the initial self-healing occurs; and a classifying module, configured to classify the metallized film capacitors by utilizing the initial self-healing voltage-energy database and combining an initial self-healing recovery condition and subsequent service lives and performance data of said metallized film capacitors.

As can be seen from the above technical solutions, compared with the prior art, the present invention provides a method and a system for initial self-healing type classification of metallized film capacitors, which have the following beneficial effects that:

1) The method for initial self-healing type classification of metallized film capacitors provided herein is simple and efficient, makes up for the vacancy of the existing online evaluation method for the usability and the applicable working condition of the metallized film capacitors, and reduces the damage to the metallized film capacitors in the testing process;

2) The method determines the service lives of the metallized film capacitors of different levels according to the service lives of the metallized film capacitors within the applicable working voltage range as measured by a large number of experiments, and provides reference basis for determining the reliability and safety of the capacitors in the subsequent use process;

3) The method for testing the service lives of the metallized film capacitors provided herein is a conventional method for measuring the service life of the capacitor in a repetitive pulse experiment, and has certain universality and reliability.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skill in the art can obtain other drawings according to the drawings provided without creative efforts.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skill in the art without creative efforts shall fall within the protection scope of the present invention.

Figure 1:
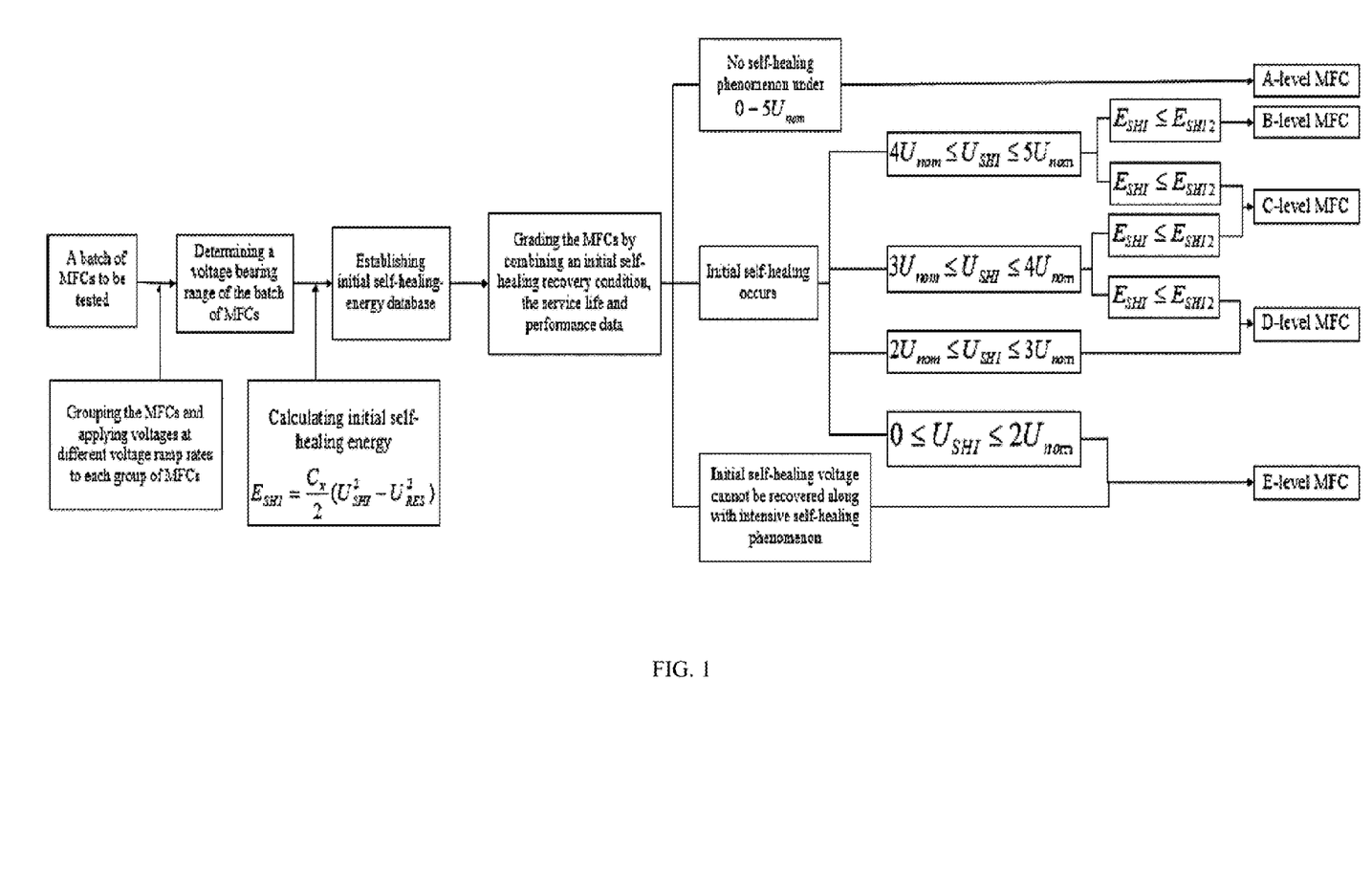
FIG. 1 is a flowchart of a method for initial self-healing type classification of metallized film capacitors.

The embodiments of the present invention provide a method for initial self-healing type classification of metallized film capacitors, and as shown in FIG. 1, the method specifically includes:

step 1: applying voltages at different voltage ramp rates to metallized film capacitors to be tested, and determining a voltage bearing range of said metallized film capacitors;

step 2: determining, according to corresponding voltages of said metallized film capacitors when initial self-healing occurs and residual voltages after the initial self-healing occurs, corresponding initial self-healing energy of metallized film capacitors when the initial self-healing occurs within the voltage bearing range of said metallized film capacitors;

step 3: establishing an initial self-healing voltage-energy database according to a corresponding relationship between the corresponding initial self-healing voltages of said metallized film capacitor samples when the initial self-healing occurs and the corresponding initial self-healing energy when the initial self-healing occurs; and step 4: classifying the metallized film capacitors by utilizing the initial self-healing voltage-energy database and combining an initial self-healing recovery condition and subsequent service lives and performance data of said metallized film capacitors.

FIG. 1 is a flowchart of a method for initial self-healing type classification of metallized film capacitors, wherein this batch of metallized film capacitors have a rated voltage $U_{nom}$ of 250V and a capacitance of 1 µF.

Figure 2A:
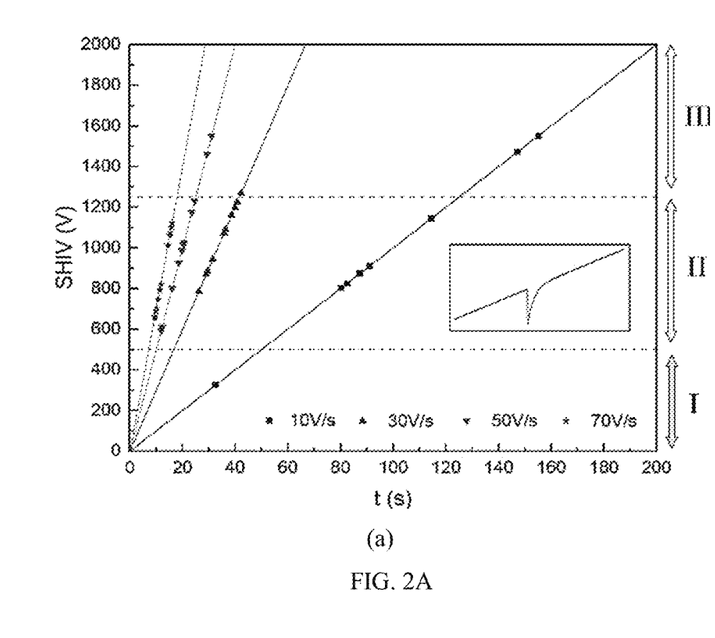
FIGS. 2A-B is a schematic diagram of a voltage range within which initial self-healing of metallized film capacitors occurs.
Figure 2B:
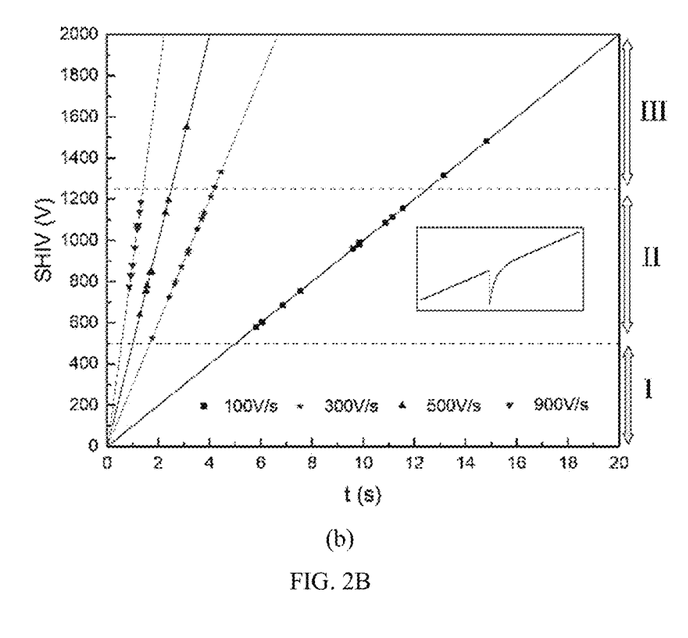

In a specific embodiment, voltages at different voltage ramp rates as shown in FIGS. 2(a) and 2(b) are applied to this batch of metallized film capacitors, and the results show that the initial self-healing voltages of only few capacitors are lower than 500V, and when the initial self-healing voltage is higher than 1250V, the voltage cannot be recovered after the metallized film capacitor is self-healed, and direct breakdown of the capacitor is easy to happen. Therefore, the voltage range within which the initial self-healing of this batch of capacitors occurs is determined to be 500~1250V ($2U_{nom}$~$5U_{nom}$).

Figure 3A:
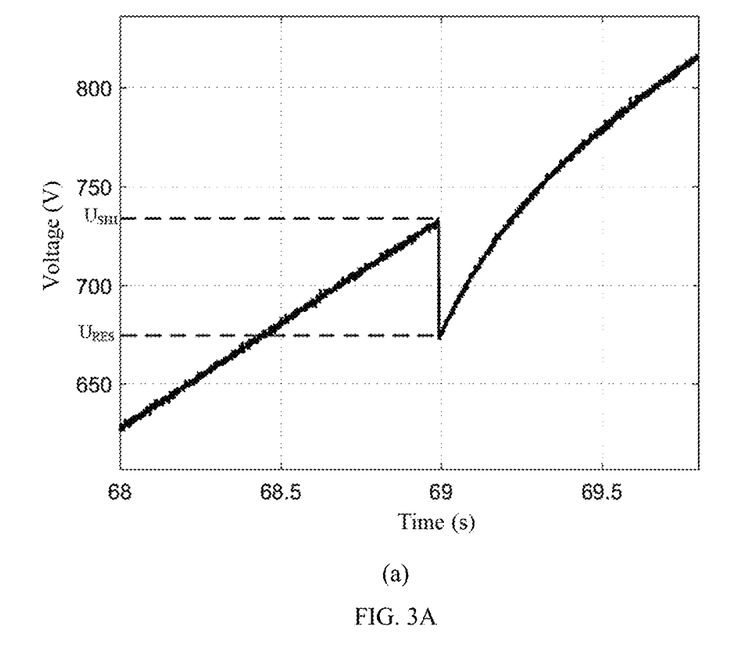
FIGS. 3A-D is a schematic diagram of the voltage change and the self-healing type of the metallized film capacitors during the initial self-healing process.

In a specific embodiment, within the voltage bearing range of the metallized film capacitors determined in the step 1, the corresponding energy when the initial self-healing of the capacitor samples occurs is calculated by using the following electrical formula, and the corresponding parameters when the initial self-healing occurs are schematically shown in FIG. 3A.

$$E_{SHI} = \frac{C_x}{2}(U_{SHI}^2 - U_{RES}^2)$$

wherein $E_{SHI}$ is the corresponding energy when the initial self-healing of said metallized film capacitors occurs, in a unit of mJ; $C_x$ is a capacitance of said metallized film capacitors, in a unit of µF, and $U_{SHI}$ is a voltage generated when the initial self-healing occurs, in a unit of V; $U_{RES}$ is the residual voltage after the initial self-healing occurs, in a unit of V.

As the capacitance of the capacitor changes slightly before and after the initial self-healing, the influence of the capacitance on the calculation of the initial self-healing energy can be ignored.

Figure 4A:
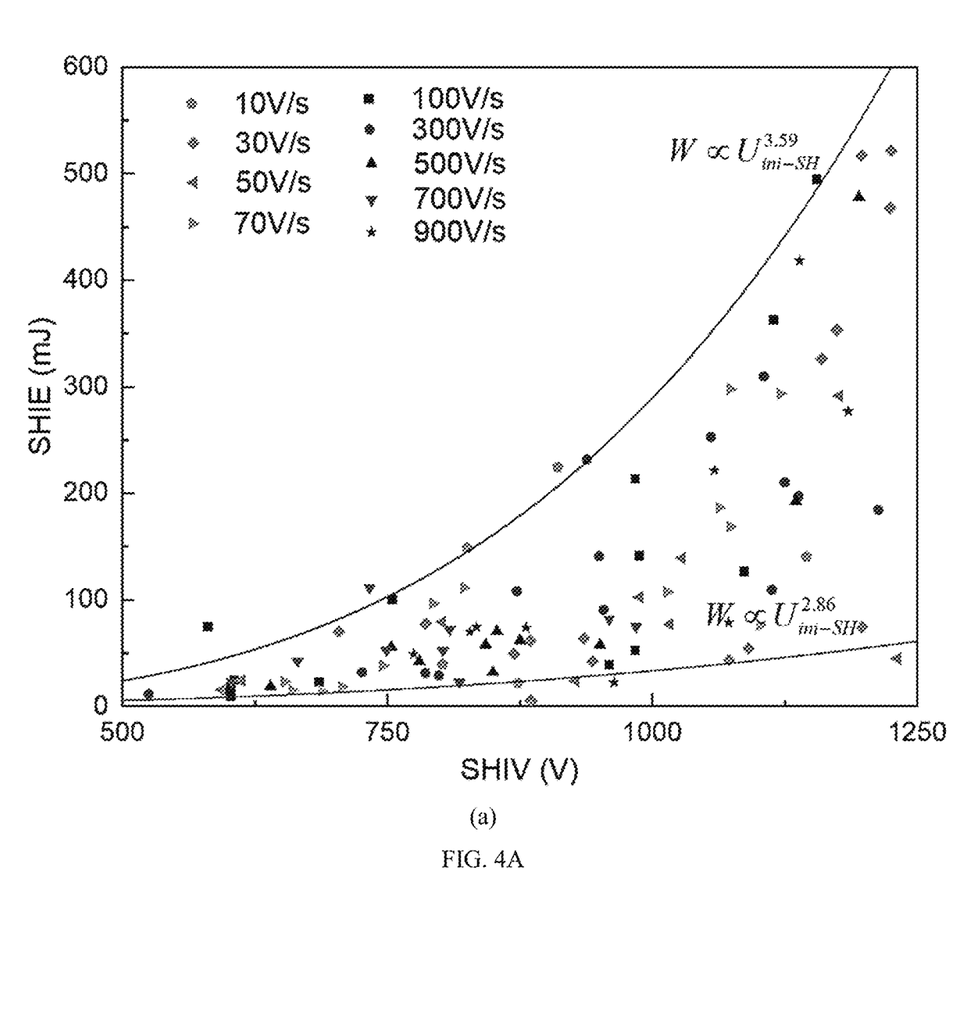
FIGS. 4A-B is a schematic diagram of an initial self-healing voltage-energy database and classification of the metallized film capacitors.

In a specific embodiment, an initial self-healing voltage-energy database is established according to the corresponding relationship between the initial self-healing voltages and the initial self-healing energy obtained in the step 2, as shown in FIG. 4A.

In a specific embodiment, the established initial self-healing voltage-energy database is subjected to a nonlinear fitting method and it is determined that the initial self-healing voltage and the initial self-healing energy meet the relation of $E_{SHI}=aU_{SHI}^n$ $n\in[2,4]$, where $n\in R$, $$a = \frac{kC_0}{\beta^\alpha \cdot f(P)},$$

$C_0$ is a capacitance, $\beta$ is a square resistance, $f(P)$ is an interlayer pressure function, and $\alpha$, k are coefficients, so as to define the boundary range of the initial self-healing voltage-energy database.

In a specific embodiment, an external voltage is applied to the metallized film capacitor, and an initial self-healing voltage boundary is defined, wherein $4U_{nom}$ is an upper boundary, and corresponding initial self-healing energy is $E_{SHI2}$; $3U_{nom}$ is a lower boundary, and corresponding initial self-healing energy is $E_{SHI1}$, and if:

(1) no self-healing occurs within $2U_{nom}$~$5U_{nom}$, the metallized film capacitor is an A-level capacitor;

(2) the initial self-healing voltage is within $4U_{nom}$~$5U_{nom}$, the initial self-healing energy is smaller than $E_{SHI2}$, and after initial self-healing recovery, the voltage can rise to $5U_{nom}$ at an original voltage ramp rate, the metallized film capacitor is a B-level capacitor, and otherwise, the metallized film capacitor is a C-level capacitor;

in addition to the case that after the initial self-healing recovery, the voltage can rise to $5U_{nom}$ at the original voltage ramp rate, the voltage can also rise to $5U_{nom}$ after independent self-healing occurs for several times, the metallized film capacitor is the B-level capacitor, and otherwise, the metallized film capacitor is the C-level capacitor;

(3) the initial self-healing voltage is within $3U_{nom}$~$4U_{nom}$, the initial self-healing energy is smaller than $E_{SHI1}$, and after initial self-healing recovery, the voltage can rise to $4U_{nom}$ at the original voltage ramp rate, the metallized film capacitor is the C-level capacitor, and otherwise, the metallized film capacitor is a D-level capacitor;

in addition to the case that after the initial self-healing recovery, the voltage can rise to $4U_{nom}$ at the original voltage ramp rate, the voltage can also rise to $4U_{nom}$ after independent self-healing occurs for several times, the metallized film capacitor is the C-level capacitor, and otherwise, the metallized film capacitor is the D-level capacitor;

(4) the initial self-healing voltage is within $2U_{nom}$~$3U_{nom}$, and after initial self-healing recovery, the voltage can rise to $3U_{nom}$ at the original voltage ramp rate, and the metallized film capacitor is the D-level capacitor;

in addition to the case that after the initial self-healing recovery, the voltage can rise to $4U_{nom}$ at the original voltage ramp rate, the voltage can also rise to $3U_{nom}$ after independent self-healing occurs for several times, and the metallized film capacitor is the D-level capacitor;

(5) the initial self-healing voltage is within $0\sim 2U_{nom}$, or the initial self-healing occurs in the above areas, the self-healing voltage cannot be recovered, and the metallized film capacitor is the E-level capacitor along with intensive self-healing.

Figure 3B:
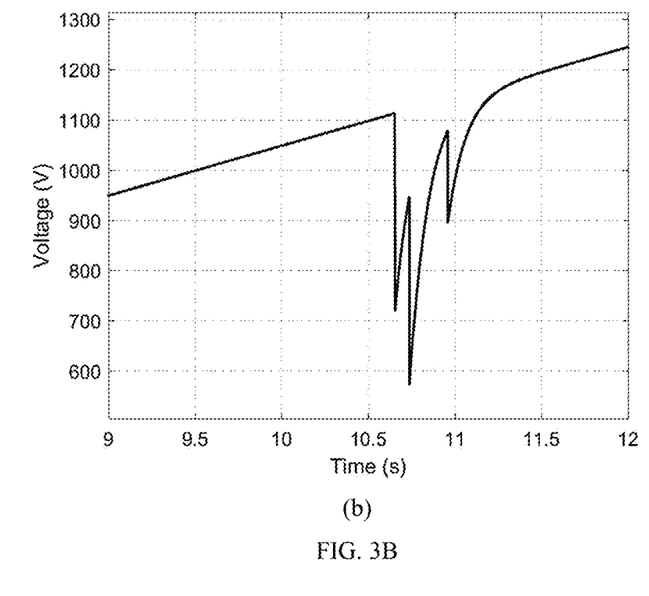
Figure 3C:
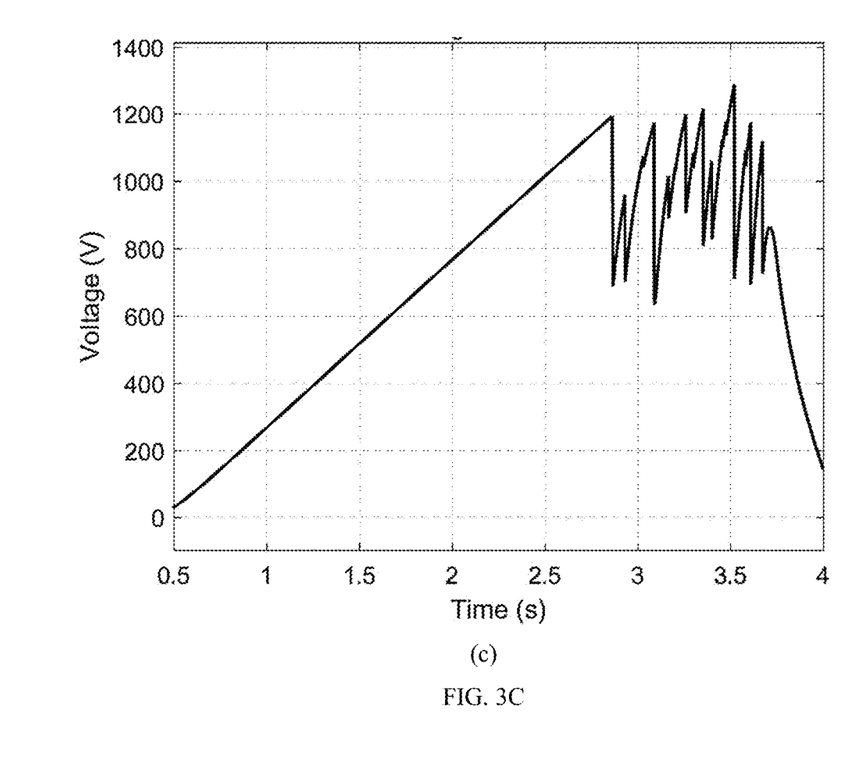
Figure 3D:
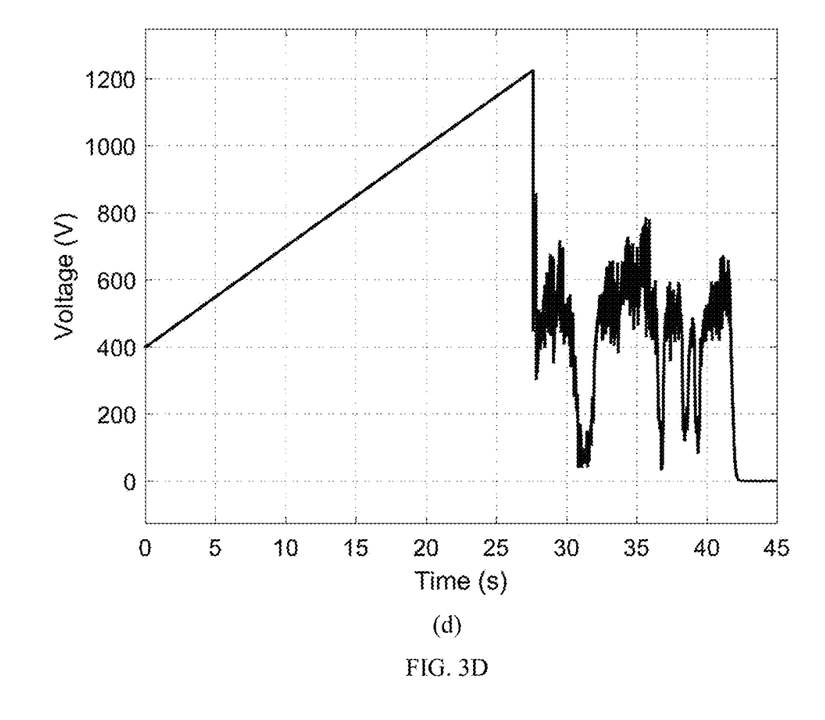
Figure 4B:
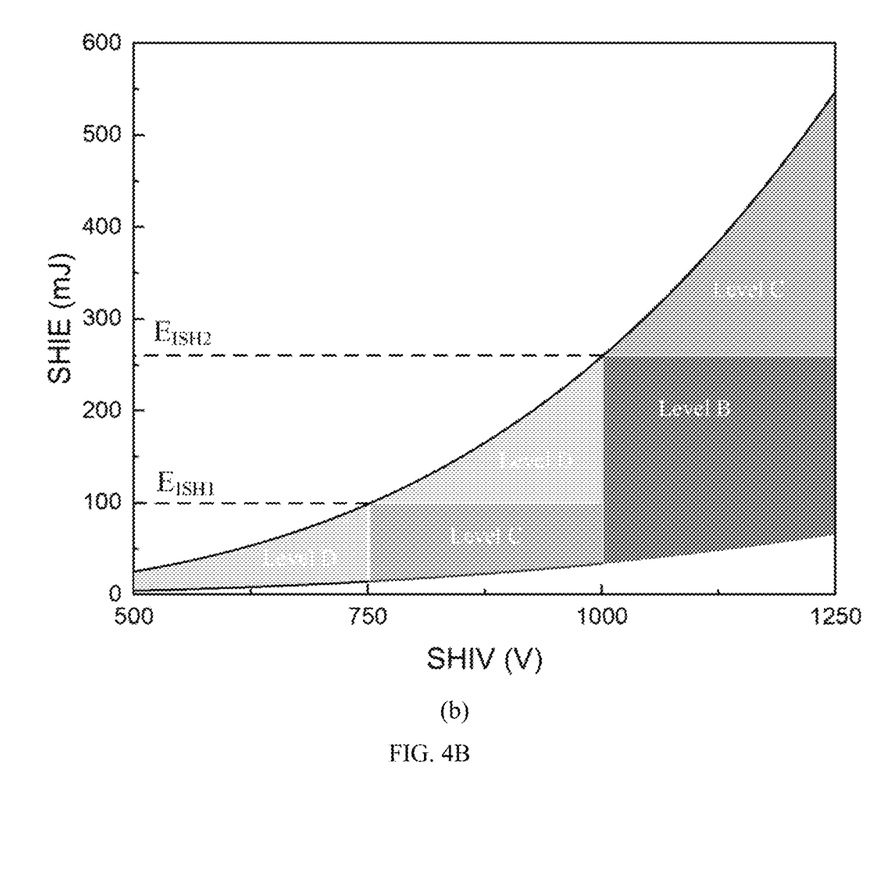

In a specific embodiment, the initial self-healing voltage-energy database of the metallized film capacitors is divided into five areas as shown in FIG. 4B. As can be seen from the existing metallized film capacitor samples, the capacitors produced in the same batch have the same manufacturing process, but the distribution of the internal electric weak points of the capacitors has randomness, and the severity of each electric weak point is different, so the metallized film capacitors inevitably have poor product performance. By means of observation and comparison of the voltage recovery condition after initial self-healing occurs in each area and the subsequent operating performance of the capacitors, it finds that when the voltage for the initial self-healing of the metallized film capacitors is between $4U_{nom}\sim 5U_{nom}$ and $3U_{nom}\sim 4U_{nom}$, if the corresponding initial self-healing energy is greater than $E_{SH2}$ and $E_{SH1}$, respectively, the self-healing process of the capacitors is easy to happen as shown in FIG. 3C. This indicates that the voltage within the operating range exceeds the endurance of the metallized film capacitors, so the capacitor having initial self-healing in the area is lowered by one operating voltage class to ensure the subsequent operating performance. If the initial self-healing condition of said metallized film capacitor is shown in FIG. 3A or 3B, the corresponding area in the database where said metallized film capacitor is located can be determined according to the initial self-healing voltage-energy, and then said metallized film capacitor is classified. If the initial self-healing condition of the metallized film capacitor is shown in FIG. 3D, the capacitor is close to the breakdown point or is already broken down, so the metallized film capacitor can be directly determined as level E.

The service life of the metallized film capacitor is defined based on the number of times of applying voltages. The metallized film capacitors with different levels are selected for testing the service lives of samples with different levels under an applicable voltage. Voltage ramp rates used when said metallized film capacitors are classified are applied to said metallized film capacitors to enable the voltages to rise to a maximum value of each corresponding level range. It is determined that the capacitor fails when a capacitance of the capacitor drops by more than 5% or the capacitor is broken down. Tests show that in this embodiment, the A-level and B-level metallized film capacitors are both used in application scenarios with the voltage lower than 1250V, wherein the service life of the A-level sample is 1400 times, and the service life of the B-level capacitor is 1000 times. The C-level metallized film capacitor is used in an application scenario with the voltage lower than 1000V, the D-level metallized film capacitor is used in an application scenario with the voltage lower than 750V, and the service lives of the C-level capacitor and the D-level capacitor are both 1200 times. The E-level capacitor is a metallized film capacitor which is irreversibly damaged in the classification process or is unsuitable for a working condition exceeding a rated voltage thereof and thus is not used.

In a specific embodiment, provided is a system for initial self-healing type classification of metallized film capacitors, which includes:

a voltage range measuring module, configured to apply voltages at different voltage ramp rates to metallized film capacitors to be tested, and determine a voltage bearing range of said metallized film capacitors;

an energy measuring module, configured to determine, according to corresponding voltages of said metallized film capacitors when initial self-healing occurs and residual voltages after the initial self-healing occurs, corresponding initial self-healing energy of said metallized film capacitors when the initial self-healing occurs within the voltage bearing range of said metallized film capacitors;

a database establishing module, configured to establish an initial self-healing voltage-energy database according to a corresponding relationship between the corresponding initial self-healing voltages of said metallized film capacitor samples when the initial self-healing occurs and the corresponding initial self-healing energy when the initial self-healing occurs; and a classifying module, configured to classify the metallized film capacitors by utilizing the initial self-healing voltage-energy database and combining an initial self-healing recovery condition and subsequent service lives and performance data of said metallized film capacitors.

In conclusion, the method for initial self-healing classification of metallized film capacitors can determine the applicable working condition of the capacitors in a simple and efficient online mode by observing the initial self-healing and the recovery condition of the capacitors, and predict the service lives of the capacitors under the applicable working condition, so as to achieve the purpose of determining whether the metallized film capacitors are safe and reliable in practical application.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be apparent to those skilled in the art, and the generic principles defined herein may be applied to other embodiments without departing from the spirit or scope of the present invention. Thus, the present invention is not intended to be limited to the embodiments shown herein but is to be accorded the broadest scope consistent with the principles and novel features disclosed herein.

The invention claimed is:

1. A method for initial self-healing type classification of metallized film capacitors, comprising:

step 1: applying voltages at different voltage ramp rates to metallized film capacitors to be tested, and determining a voltage bearing range of the metallized film capacitors;

step 2: determining, according to corresponding voltages of the metallized film capacitors when initial self-healing occurs and residual voltages after the initial self-healing occurs, corresponding initial self-healing energy of metallized film capacitors when the initial self-healing occurs within the voltage bearing range of the metallized film capacitors;

step 3: establishing an initial self-healing voltage-energy database according to a corresponding relationship between the corresponding initial self-healing voltages of the metallized film capacitor samples when the initial self-healing occurs and the corresponding initial self-healing energy when the initial self-healing occurs; and step 4: classifying the metallized film capacitors by utilizing the initial self-healing voltage-energy database and combining an initial self-healing recovery condition and subsequent service lives and performance data of the metallized film capacitors; wherein the initial self-healing voltage-energy database is established according to the corresponding relationship between the initial self-healing voltages and the initial self-healing energy obtained in the step 2, the established initial self-healing voltage-energy database is subjected to a nonlinear fitting method, and it is determined that the initial self-healing voltage and the initial self-healing energy meet a relation of $E_{SHI}=aU_{SHI}^n$, $n\in[2,4]$, where $n\in R$, $$a = \frac{kC_0}{\beta^\alpha \cdot f(P)},$$

$C_0$ is a capacitance, $\beta$ is a square resistance, $f(P)$ is an interlayer pressure function, and $\alpha$, $k$ are coefficients, so as to define a boundary range of the initial self-healing voltage-energy database;

an external voltage is applied to the metallized film capacitor, and an initial self-healing voltage boundary is defined, wherein $4U_{nom}$ is an upper boundary, and corresponding initial self-healing energy is $E_{SHI2}$; $3U_{nom}$ is a lower boundary, and corresponding initial self-healing energy is $E_{SHI1}$, and if:

(1) no self-healing occurs within $2U_{nom} \sim 5U_{nom}$, the metallized film capacitor is an A-level capacitor;

(2) the initial self-healing voltage is within $4U_{nom} \sim 5U_{nom}$, the initial self-healing energy is smaller than $E_{SHI2}$, and after initial self-healing recovery, the voltage can rise to $5U_{nom}$ at an original voltage ramp rate, the metallized film capacitor is a B-level capacitor, and otherwise, the metallized film capacitor is a C-level capacitor;

in addition to the case that after the initial self-healing recovery, the voltage can rise to $5U_{nom}$ at the original voltage ramp rate, the voltage can also rise to $5U_{nom}$ after independent self-healing occurs for several times, the metallized film capacitor is the B-level capacitor, and otherwise, the metallized film capacitor is the C-level capacitor;

(3) the initial self-healing voltage is within $3U_{nom} \sim 4U_{nom}$, the initial self-healing energy is smaller than $E_{SHI1}$, and after initial self-healing recovery, the voltage can rise to $4U_{nom}$ at the original voltage ramp rate, the metallized film capacitor is the C-level capacitor, and otherwise, the metallized film capacitor is a D-level capacitor;

in addition to the case that after the initial self-healing recovery, the voltage can rise to $4U_{nom}$ at the original voltage ramp rate, the voltage can also rise to $4U_{nom}$ after independent self-healing occurs for several times, the metallized film capacitor is the C-level capacitor, and otherwise, the metallized film capacitor is the D-level capacitor;

(4) the initial self-healing voltage is within $2U_{nom} \sim 3U_{nom}$, and after initial self-healing recovery, the voltage can rise to $3U_{nom}$ at the original voltage ramp rate, and the metallized film capacitor is the D-level capacitor;

in addition to the case that after the initial self-healing recovery, the voltage can rise to $4U_{nom}$ at the original voltage ramp rate, the voltage can also rise to $3U_{nom}$ after independent self-healing occurs for several times, and the metallized film capacitor is the D-level capacitor;

(5) the initial self-healing voltage is within $0 \sim 2U_{nom}$, or the initial self-healing occurs in the areas of (1) to (4), the self-healing voltage cannot be recovered, and the metallized film capacitor is an E-level capacitor along with intensive self-healing; and the service lives of the metallized film capacitors are defined based on the number of times of applying voltages, the metallized film capacitors with different levels are selected for testing the service lives of the samples with different levels under an applicable voltage, voltage ramp rates used when the metallized film capacitors are classified are applied to the metallized film capacitors to enable the voltages to rise to a maximum value of each corresponding level range, and it is determined that the capacitor fails when a capacitance of the capacitor drops by more than 5% or the capacitor is broken down; the A-level and B-level metallized film capacitors are both used in application scenarios with the voltage lower than 1250V, wherein the service life of the A-level sample is 1400 times, the service life of the B-level capacitor is 1000 times, the C-level metallized film capacitor is used in an application scenario with the voltage lower than 1000V, the D-level metallized film capacitor is used in an application scenario with the voltage lower than 750V, the service lives of the C-level capacitor and the D-level capacitor are both 1200 times, and the E-level capacitor is a metallized film capacitor which is irreversibly damaged in the classification process or is unsuitable for a working condition exceeding a rated voltage thereof and thus is not used.

2. The method for initial self-healing type classification of metallized film capacitors according to claim 1, wherein step 1 further comprises:

according to the corresponding voltages of the metallized film capacitors when the initial self-healing occurs and the initial self-healing recovery condition under the voltages at the different voltage ramp rates, specifying $U_{nom}$ as a nominal voltage of the metallized film capacitors, and taking a voltage range of $U_1 \sim U_4$ as the voltage bearing range of the metallized film capacitors, when the external voltage is less than $U_1$, no self-healing phenomenon generated in the capacitors;

and when the external voltage is more than $U_4$, the voltage exceeding a self-healing recovery bearing range of the capacitors.

3. The method for initial self-healing type classification of metallized film capacitors according to claim 1, wherein step 2 further comprises:

within the voltage bearing range of the metallized film capacitors determined in the step 1, determining, by using an electrical formula, the corresponding energy when the initial self-healing of the metallized film capacitors occurs, wherein the formula is as follows:

$$E_{SHI} = \frac{C_x}{2}\left(U_{SHI}^2 - U_{RES}^2\right)$$

wherein $E_{SHI}$ is the corresponding energy when the initial self-healing of the metallized film capacitors occurs, in a unit of mJ; $C_x$ is a capacitance of the metallized film capacitors, in a unit of μF, and $U_{SHI}$ is a voltage generated when the initial self-healing occurs, in a unit of V; $U_{RES}$ is the residual voltage after the initial self-healing occurs, in a unit of V.

4. The method for initial self-healing type classification of metallized film capacitors according to claim 3, wherein step 3 further comprises:

subjecting the established initial self-healing voltage-energy database to a nonlinear fitting method and determining that the initial self-healing voltage and the initial self-healing energy meet the relation of $E_{SHI}=aU_{SHI}^n$ $n \in [2,4]$, where $n \in R$, $$a = \frac{kC_0}{\beta^\alpha \cdot f(P)},$$

$C_0$ is the capacitance, $\beta$ is the square resistance, $f(P)$ is the interlayer pressure function, and $\alpha$, k are the coefficients, so as to define the boundary range of the initial self-healing voltage-energy database.

5. The method for initial self-healing type classification of metallized film capacitors according to claim 2, wherein an applicable voltage range of the metallized film capacitors is demarcated according to the multiple of the nominal voltage $U_{nom}$ of the metallized film capacitors, and the capacitors are classified according to the initial self-healing recovery condition, and a specific classification method is as follows:

an external voltage is applied to the metallized film capacitor, and the initial self-healing voltage boundary is defined, wherein $U_3$ is the upper boundary, and the corresponding initial self-healing energy is $E_{SHI2}$; $U_2$ is the lower boundary, and the corresponding initial self-healing energy is $E_{SHI1}$, and if:

(1) no self-healing occurs within $U_1$~$U_4$, the metallized film capacitor is an A-level capacitor;

(2) the initial self-healing voltage is within $U_3$~$U_4$, the initial self-healing energy is smaller than $E_{SHI2}$, and after initial self-healing recovery, the voltage can rise to $U_4$ at an original voltage ramp rate, the metallized film capacitor is a B-level capacitor, and otherwise, the metallized film capacitor is a C-level capacitor;

(3) the initial self-healing voltage is within $U_2$~$U_3$, the initial self-healing energy is smaller than $E_{SHI1}$, and after initial self-healing recovery, the voltage can rise to $U_3$ at the original voltage ramp rate, the metallized film capacitor is the C-level capacitor, and otherwise, the metallized film capacitor is a D-level capacitor;

(4) the initial self-healing voltage is within $U_1$~$U_2$, and after initial self-healing recovery, the voltage can rise to $U_2$ at the original voltage ramp rate, and the metallized film capacitor is the D-level capacitor; and (5) the initial self-healing voltage is within 0~$U_1$, or the initial self-healing occurs in the above areas, the self-healing voltage cannot be recovered, and the metallized film capacitor is the E-level capacitor along with intensive self-healing.

6. A system for initial self-healing type classification of metallized film capacitors, comprising:

a voltage range measuring module, configured to apply voltages at different voltage ramp rates to metallized film capacitors to be tested, and determine a voltage bearing range of the metallized film capacitors;

an energy measuring module, configured to determine, according to corresponding voltages of the metallized film capacitors when initial self-healing occurs and residual voltages after the initial self-healing occurs, corresponding initial self-healing energy of the metallized film capacitors when the initial self-healing occurs within the voltage bearing range of the metallized film capacitors;

a database establishing module, configured to establish an initial self-healing voltage-energy database according to a corresponding relationship between the corresponding initial self-healing voltages of the metallized film capacitor samples when the initial self-healing occurs and the corresponding initial self-healing energy when the initial self-healing occurs; and a classifying module, configured to classify the metallized film capacitors by utilizing the initial self-healing voltage-energy database and combining an initial self-healing recovery condition and subsequent service lives and performance data of the metallized film capacitors; wherein the initial self-healing voltage-energy database is established according to the corresponding relationship between the initial self-healing voltages and the initial self-healing energy, the established initial self-healing voltage-energy database is subjected to a nonlinear fitting method, and it is determined that the initial self-healing voltage and the initial self-healing energy meet a relation of $E_{SHI}=aU_{SHI}^n$ $n \in [2,4]$, where $n \in R$, $$a = \frac{kC_0}{\beta^\alpha \cdot f(P)},$$

$C_0$ is a capacitance, $\beta$ is a square resistance, $f(P)$ is an interlayer pressure function, and $\alpha$, k are coefficients, so as to define a boundary range of the initial self-healing voltage-energy database;

an external voltage is applied to the metallized film capacitor, and an initial self-healing voltage boundary is defined, wherein $4U_{nom}$ is an upper boundary, and corresponding initial self-healing energy is $E_{SHI2}$; $3U_{nom}$ is a lower boundary, and corresponding initial self-healing energy is $E_{SHI1}$, and if:

(1) no self-healing occurs within $2U_{nom}$~$5U_{nom}$, the metallized film capacitor is an A-level capacitor;

(2) the initial self-healing voltage is within $4U_{nom}$~$5U_{nom}$, the initial self-healing energy is smaller than $E_{SHI2}$, and after initial self-healing recovery, the voltage can rise to $5U_{nom}$ at an original voltage ramp rate, the metallized film capacitor is a B-level capacitor, and otherwise, the metallized film capacitor is a C-level capacitor;

in addition to the case that after the initial self-healing recovery, the voltage can rise to $5U_{nom}$ at the original voltage ramp rate, the voltage can also rise to $5U_{nom}$ after independent self-healing occurs for several times, the metallized film capacitor is the B-level capacitor, and otherwise, the metallized film capacitor is the C-level capacitor;

(3) the initial self-healing voltage is within $3U_{nom}$~$4U_{nom}$, the initial self-healing energy is smaller than $E_{SHI1}$, and after initial self-healing recovery, the voltage can rise to $4U_{nom}$ at the original voltage ramp rate, the metallized film capacitor is the C-level capacitor, and otherwise, the metallized film capacitor is a D-level capacitor;

in addition to the case that after the initial self-healing recovery, the voltage can rise to $4U_{nom}$ at the original voltage ramp rate, the voltage can also rise to $4U_{nom}$ after independent self-healing occurs for several times, the metallized film capacitor is the C-level capacitor, and otherwise, the metallized film capacitor is the D-level capacitor;

(4) the initial self-healing voltage is within $2U_{nom}\sim3U_{nom}$, and after initial self-healing recovery, the voltage can rise to $3U_{nom}$ at the original voltage ramp rate, and the metallized film capacitor is the D-level capacitor;

in addition to the case that after the initial self-healing recovery, the voltage can rise to $4U_{nom}$ at the original voltage ramp rate, the voltage can also rise to $3U_{nom}$ after independent self-healing occurs for several times, and the metallized film capacitor is the D-level capacitor; and (5) the initial self-healing voltage is within $0\sim2U_{nom}$, or the initial self-healing occurs in the areas of (1) to (4), the self-healing voltage cannot be recovered, and the metallized film capacitor is an E-level capacitor along with intensive self-healing;

the service lives of the metallized film capacitors are defined based on the number of times of applying voltages, the metallized film capacitors with different levels are selected for testing the service lives of the samples with different levels under an applicable voltage, voltage ramp rates used when the metallized film capacitors are classified are applied to the metallized film capacitors to enable the voltages to rise to a maximum value of each corresponding level range, and it is determined that the capacitor fails when a capacitance of the capacitor drops by more than 5% or the capacitor is broken down; the A-level and B-level metallized film capacitors are both used in application scenarios with the voltage lower than 1250V, wherein the service life of the A-level sample is 1400 times, the service life of the B-level capacitor is 1000 times, the C-level metallized film capacitor is used in an application scenario with the voltage lower than 1000V, the D-level metallized film capacitor is used in an application scenario with the voltage lower than 750V, the service lives of the C-level capacitor and the D-level capacitor are both 1200 times, and the E-level capacitor is a metallized film capacitor which is irreversibly damaged in the classification process or is unsuitable for a working condition exceeding a rated voltage thereof and thus is not used.

* * * * *